US012603211B2

(12) United States Patent
Lee et al.

(10) Patent No.: US 12,603,211 B2

(45) Date of Patent: Apr. 14, 2026

(54) COIL COMPONENT

(71) Applicant: SAMSUNG ELECTRO-MECHANICS CO., LTD., Suwon-si (KR)

(72) Inventors: Jae Wook Lee, Suwon-si (KR); In Young Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 644 days.

(21) Appl. No.: 17/987,415

(22) Filed: Nov. 15, 2022

(65) Prior Publication Data

US 2023/0170123 A1 Jun. 1, 2023

(30) Foreign Application Priority Data

Dec. 1, 2021 (KR) ........................ 10-2021-0170007

(51) Int. Cl.

*H01F 17/04* (2006.01)
*H01F 17/00* (2006.01)
*H01F 27/28* (2006.01)
*H01F 27/32* (2006.01)

(52) U.S. Cl.

CPC ......... *H01F 17/0013* (2013.01); *H01F 17/04* (2013.01); *H01F 27/2828* (2013.01); *H01F 27/324* (2013.01); *H01F 2017/048* (2013.01)

(58) Field of Classification Search

CPC .. H01F 17/0013; H01F 17/04; H01F 27/2828; H01F 27/324; H01F 2017/048; H01F 27/022; H01F 17/02; H01F 17/045; H01F 27/2823; H01F 27/292; H01F 27/08; H01F 27/29; H01F 27/306; H01F 27/22; H01F 27/2804

See application file for complete search history.

(56) References Cited

U.S. PATENT DOCUMENTS

2014/0028430 A1* 1/2014 Lee ........................ H01F 27/292 336/200
2016/0260535 A1* 9/2016 Kubota ............... H01F 17/0013
2016/0276089 A1* 9/2016 Inoue .................. H01F 17/0033
2018/0166211 A1* 6/2018 Takatsuji .............. H02M 3/156
(Continued)

FOREIGN PATENT DOCUMENTS

JP 2020-057804 A 4/2020
KR 10-2020-0121529 A 10/2020
(Continued)

OTHER PUBLICATIONS

Office Action issued in corresponding Korean Patent Application No. 10-2021-0170007 on Jan. 26, 2026, with English translation.

*Primary Examiner* — Mang Tin Bik Lian

(74) *Attorney, Agent, or Firm* — MORGAN, LEWIS & BOCKIUS LLP

(57) ABSTRACT

A coil component includes a body, a coil portion disposed in the body and including lead-out portions exposed to one surface of the body; external electrodes disposed on the body and connected to the lead-out portions, and a surface insulating layer disposed on the body and including fillers, in which a ratio of a cross-sectional area of the fillers to a cross-sectional area of the entire surface insulating layer is 25% or more and 40% or less in a cross section of the surface insulating layer.

21 Claims, 7 Drawing Sheets

I-I'

A

(56) References Cited

U.S. PATENT DOCUMENTS

| | | | | |
|---|---|---|---|---|
| 2018/0286568 | A1* | 10/2018 | Suzuki | H01F 41/122 |
| 2018/0366246 | A1* | 12/2018 | Park | H01F 17/04 |
| 2020/0203062 | A1* | 6/2020 | Lee | H01F 3/10 |
| 2020/0373074 | A1* | 11/2020 | Yoshioka | H01F 27/255 |
| 2021/0233703 | A1 | 7/2021 | Jung et al. | |

FOREIGN PATENT DOCUMENTS

| | | | |
|---|---|---|---|
| KR | 10-2176276 | B1 | 11/2020 |
| KR | 10-2021-0038085 | A | 4/2021 |
| KR | 10-2276386 | B1 | 7/2021 |

* cited by examiner

A

COIL COMPONENT

CROSS-REFERENCE TO RELATED APPLICATION(S)

This application claims benefit of priority to Korean Patent Application No. 10-2021-0170007 filed on Dec. 1, 2021 in the Korean Intellectual Property Office, the disclosure of which is incorporated herein by reference in its entirety.

TECHNICAL FIELD

The present disclosure relates to a coil component.

BACKGROUND

An inductor, a coil component, is a representative passive electronic component used in an electronic device, together with a resistor and a capacitor.

In general, a coil component is completed by forming a body in which a coil portion is disposed and forming an external electrode on a surface of the body.

Meanwhile, as a current applied to the coil component increases, the need for heat dissipation of the coil component is increasing.

SUMMARY

An aspect of the present disclosure may provide a coil component having improved heat dissipation performance.

Another aspect of the present disclosure may provide a coil component capable of preventing a defect in which a coating layer is peeled off while having improved heat dissipation performance.

Another aspect of the present disclosure may provide a coil component capable of preventing a chip adhering defect while having improved heat dissipation performance.

According to an aspect of the present disclosure, a coil component includes a body, a coil portion disposed in the body and including lead-out portions extending from one surface of the body; external electrodes disposed on the body and connected to the lead-out portions, and a surface insulating layer disposed on the body and including fillers, in which a ratio of a cross-sectional area of the fillers to a cross-sectional area of the entire surface insulating layer is 25% or more and 40% or less in a cross section of the surface insulating layer.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
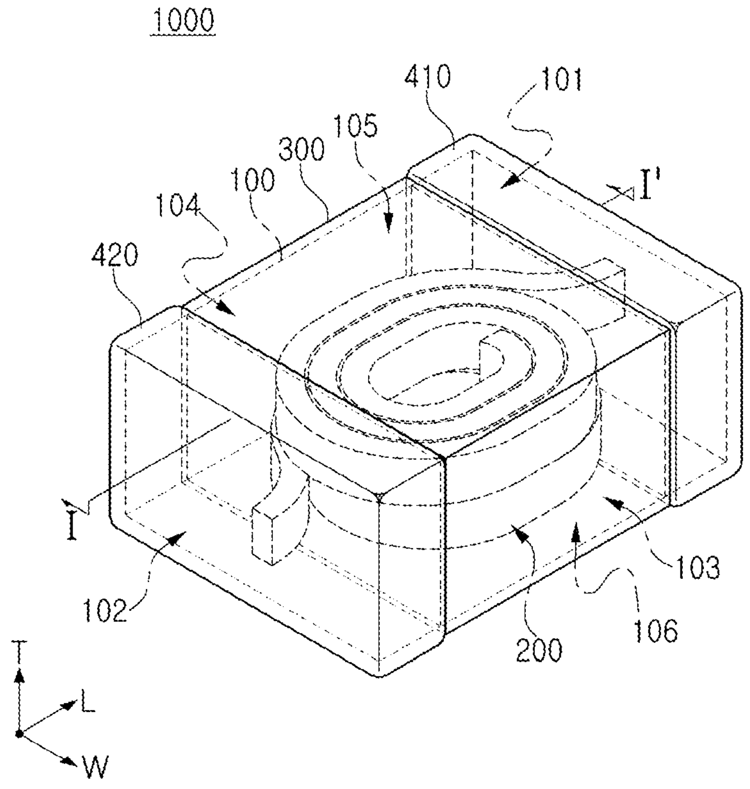
FIG. 1 is a view schematically illustrating a coil component according to an exemplary embodiment in the present disclosure.

Hereinafter, exemplary embodiments in the present disclosure will now be described in detail with reference to the accompanying drawings.

In the drawings, an L direction refers to a first direction or a length direction, a W direction refers to a second direction or a width direction, and a T direction refers to a third direction or a thickness direction.

Hereinafter, coil components according to exemplary embodiment in the present disclosure will be described in detail with reference to the accompanying drawings. In describing exemplary embodiments in the present disclosure with reference to the accompanying drawings, components that are the same as or correspond to each other will be denoted by the same reference numerals, and an overlapping description therefor will be omitted.

Various kinds of electronic components may be used in an electronic device, and various kinds of coil components may be appropriately used between these electronic components for purposes such as noise removal.

That is, the coil components used in the electronic device may be a power inductor, a high frequency (HF) inductor, a general bead, a high frequency bead (GHz bead), a common mode filter, and the like.

Figure 2:
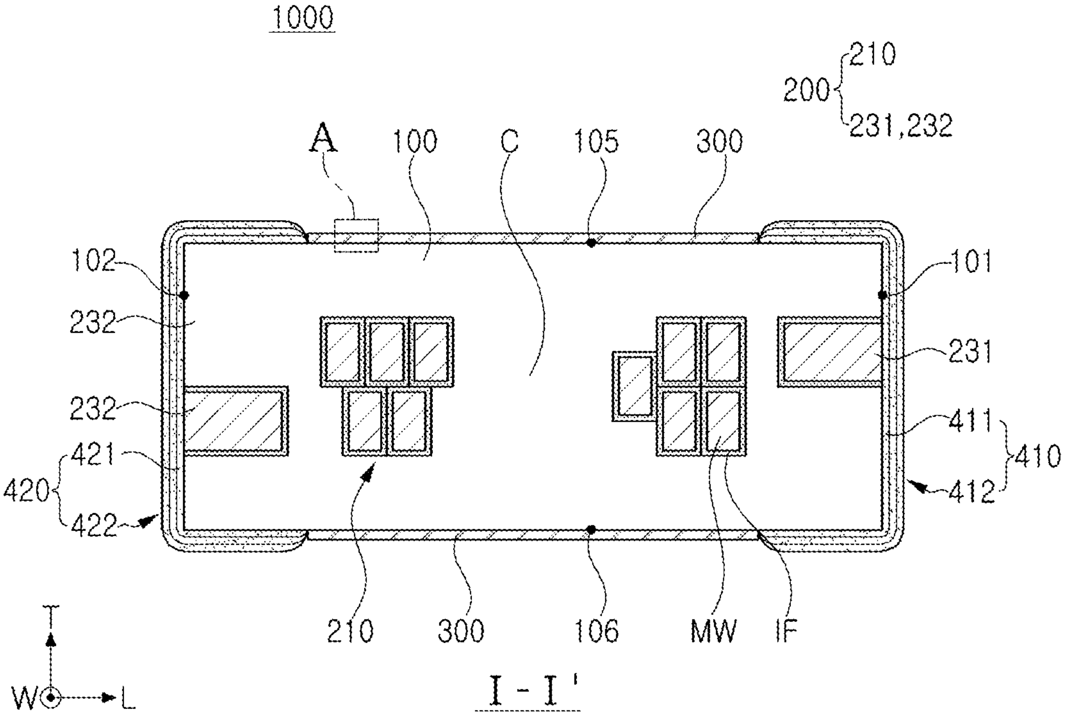
FIG. 2 is a schematic cross-sectional view taken along line I-I' of FIG. 1.
Figure 3:
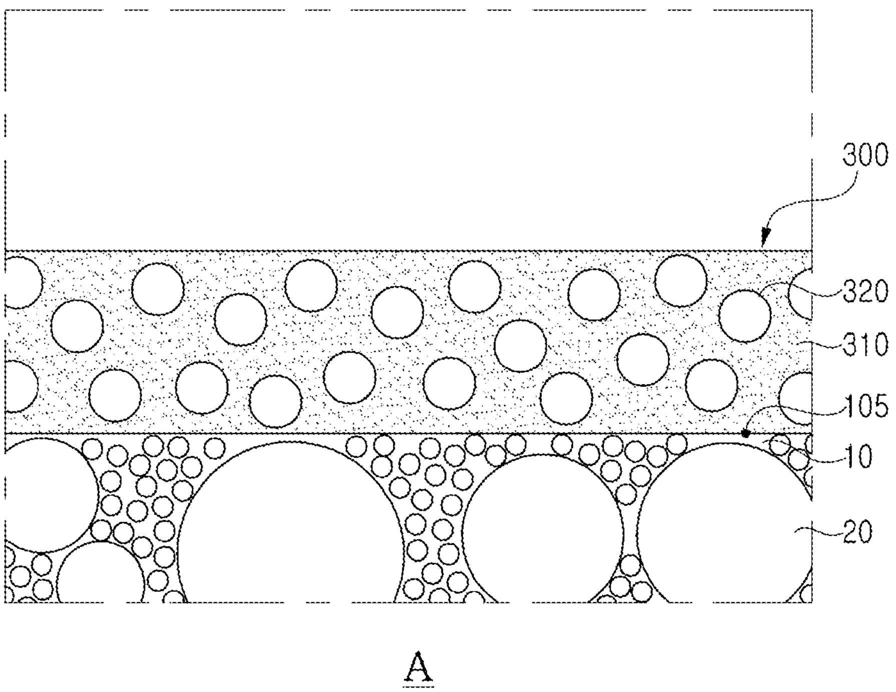
FIG. 3 is an enlarged view schematically illustrating a region A of FIG. 2.

FIG. 1 is a view schematically illustrating a coil component according to an exemplary embodiment in the present disclosure. FIG. 2 is a schematic cross-sectional view taken along line I-I' of FIG. 1. FIG. 3 is an enlarged view schematically illustrating a region A of FIG. 2.

Referring to FIGS. 1 and 2, a coil component 1000 according to an exemplary embodiment in the present disclosure may include a body 100, a coil portion 200, a surface insulating layer 300, and external electrodes 410 and 420. In some embodiments, the coil component may include a single coil portion.

The body 100 may form an appearance of the coil component 1000 according to the present exemplary embodiment, and the coil portion 200 may be embedded in the body 100.

The body 100 may generally have a hexahedral shape.

The body 100 may have a first surface 101 and a second surface 102 opposing each other in the length direction L, a third surface 103 and a fourth surface 104 opposing each other in the width direction W, and a fifth surface 105 and a sixth surface 106 opposing each other in the thickness direction T in FIGS. 1 and 2. Each of the first to fourth surfaces 101 to 104 of the body 100 may connect the fifth and sixth surfaces 105 and 106 of the body 100 to each other. The sixth surface 106 of the body 100 may be used as a mounting surface when the coil component 1000 according to the present exemplary embodiment is mounted on a mounting board such as a printed circuit board.

The body 100 may be formed so that the coil component 1000 according to the present exemplary embodiment in which the surface insulating layer 300 and the external electrodes 410 and 420 to be described later are formed has a length of 2.5 mm, a width of 2.0 mm, and a thickness of 1.0 mm, a length of 1.6 mm, a width of 0.8 mm, and a thickness of 0.8 mm, a length of 1.0 mm, a width of 0.5 mm, and a thickness of 0.5 mm, or a length of 0.8 mm, a width of 0.4 mm, and a thickness of 0.65 mm by way of example, but is not limited thereto. Meanwhile, since the above-described exemplary numerical values of the length, width, and thickness of the coil component 1000 refer to numerical values that do not reflect process errors, it should be considered that numerical values in a range that can be recognized as process errors correspond to the above-described exemplary numerical values.

The length of the coil component 1000 described above may refer to the largest value among dimensions of a plurality of line segments that connect two outermost boundary lines of the coil component 1000 facing each other in the length direction L in parallel to the length direction L and are spaced apart from each other in the thickness direction T, in an image of a cross section of a central portion of the coil component 1000 in the width direction W, the image being taken by an optical microscope or a scanning electron microscope (SEM), and the cross section being taken along the length direction L and the thickness direction T. Alternatively, the length of the coil component 1000 may refer to the smallest value among the dimensions of the plurality of line segments described above. Alternatively, the length of the coil component 1000 may refer to an arithmetic mean value of at least three of the dimensions of the plurality of line segments described above. Here, the plurality of line segments parallel to the length direction L may be equally spaced apart from each other in the thickness direction T, but the scope of the present disclosure is not limited thereto.

The thickness of the coil component 1000 described above may refer to the largest value among dimensions of a plurality of line segments that connect two outermost boundary lines of the coil component 1000 facing each other in the thickness direction T in parallel to the thickness direction T and are spaced apart from each other in the length direction L, in an image of a cross section of a central portion of the coil component 1000 in the width direction W, the image being taken by an optical microscope or an SEM, and the cross section being taken along the length direction L and the thickness direction T. Alternatively, the thickness of the coil component 1000 may refer to the smallest value among the dimensions of the plurality of line segments described above. Alternatively, the thickness of the coil component 1000 may refer to an arithmetic mean value of at least three of the dimensions of the plurality of line segments described above. Here, the plurality of line segments parallel to the thickness direction T may be equally spaced apart from each other in the length direction L, but the scope of the present disclosure is not limited thereto.

The width of the coil component 1000 described above may refer to the largest value among dimensions of a plurality of line segments that connect two outermost boundary lines of the coil component 1000 facing each other in the width direction W in parallel to the width direction W and are spaced apart from each other in the length direction L, in an image of a cross section of a central portion of the coil component 1000 in the thickness direction T, the image being taken by an optical microscope or an SEM, and the cross section being taken along the length direction L and the width direction W. Alternatively, the width of the coil component 1000 may refer to the smallest value among the dimensions of the plurality of line segments described above. Alternatively, the width of the coil component 1000 may refer to an arithmetic mean value of at least three of the dimensions of the plurality of line segments described above. Here, the plurality of line segments parallel to the width direction W may be equally spaced apart from each other in the length direction L, but the scope of the present disclosure is not limited thereto.

Alternatively, each of the length, the width, and the thickness of the coil component 1000 may be measured by a micrometer measurement method. According to the micrometer measurement method, measurement may be performed by zeroing a micrometer subjected to gage repeatability and reproducibility (R&R), inserting the coil component 1000 according to the present exemplary embodiment between tips of the micrometer, and turning a measurement lever of the micrometer. Meanwhile, when measuring the length of the coil component 1000 by the micrometer measurement method, the length of the coil component 1000 may refer to a value obtained by performing the measurement once, or an arithmetic mean of values obtained by performing the measurement multiple times. The same may apply to the width and the thickness of the coil component 1000.

The body 100 may include a core C penetrating through a central portion of the coil portion 200 to be described later. The core C may be formed by filling a through-hole formed at the central portion of the coil portion 200 with a magnetic composite sheet when forming the body 100 by stacking one or more magnetic composite sheets containing magnetic metal powder and an insulating resin on and under the coil portion 200, but is not limited thereto.

The body 100 may contain an insulating resin 10 and metal magnetic particles 20. Specifically, the body 100 may be formed by stacking one or more magnetic composite sheets containing an insulating resin and metal magnetic powder dispersed in the insulating resin. The metal magnetic powder of the magnetic composite sheet may become the metal magnetic particles 20 of the body 100 through a subsequent process.

The insulating resin 10 may include epoxy, polyimide, liquid crystal polymer (LCP), or the like, or mixtures thereof, but is not limited thereto.

The metal magnetic particles 20 may include one or more selected from the group consisting of iron (Fe), silicon (Si), chromium (Cr), cobalt (Co), molybdenum (Mo), aluminum (Al), niobium (Nb), copper (Cu), boron (B), and nickel (Ni). For example, the metal magnetic particles 20 may be formed using at least one of pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si-based alloy powder, Fe—Si—Cu—Nb-based alloy powder, Fe—Ni—Cr-based alloy powder, or Fe—Cr—Al-based alloy powder.

The metal magnetic particles 20 may be amorphous or crystalline. For example, the metal magnetic particles 20 may be Fe—Si-based amorphous alloy powder, but are not necessarily limited thereto. The metal magnetic particles 20 may have an average diameter of about 0.1 μm to 30 μm, but is not limited thereto. Meanwhile, in the present specification, the diameter may mean particle size distribution expressed as $D_{90}$, $D_{50}$, or the like.

The body 100 may contain two or more kinds of metal magnetic particles 20 dispersed in a resin. Here, different kinds of metal magnetic particles 20 mean that metal magnetic particles 20 dispersed in a resin are distinguished from each other by any one of an average diameter, a composition, crystallinity, and a shape.

The coil portion 200 may be disposed in the body 100, and may implement a characteristic of the coil component. For example, in a case where the coil component 1000 according to the present exemplary embodiment is used as a power inductor, the coil portion 200 may serve to store an electric field as a magnetic field to maintain an output voltage, thereby stabilizing power of an electronic device.

The coil portion 200 may be a winding type coil formed by winding a linear element including a metal wire MW such as a copper wire and an insulating film IF coating a surface of the metal wire MW in a spiral shape.

The coil portion 200 may include a winding portion 210 forming at least one turn around the core C, and lead-out portions 231 and 232 extending from opposite ends of the winding portion 210, respectively, and exposed to (or extending from) the first and second surfaces of the body 100, respectively. The first lead-out portion 231 may extend from one end of the winding portion 210 and be exposed to the first surface 101 of the body 100, and the second lead-out portion 232 may extend from the other end of the winding portion 210 and be exposed to the second surface 102 of the body 100. Meanwhile, it may be said that the first and second lead-out portions 231 and 232 exposed to the first and second surfaces 101 and 102 of the body 100 correspond to a part of the first and second surfaces 101 and 102 of the body 100. However, in the present specification, for convenience of explanation, the surfaces to which the first and second lead-out portions 231 and 232 are exposed and the first and second surfaces 101 and 102 of the body 100 are to be distinguished from each other.

The winding portion 210 may be formed by winding the above-described linear element in a spiral shape. As a result, in a cross-section (for example, the L-T cross-section as in FIG. 2) of the component, all surfaces of each turn of the winding portion 210 (corresponding to a total of four line segments constituting an upper surface, a lower surface, and two side surfaces of each turn in the L-T cross section in FIG. 2, the two side surfaces opposing each other in the L direction), are coated with the insulating film IF. The winding portion 210 may include at least one layer. Each layer of the winding portion 210 may be formed in a planar spiral shape, and may form at least one turn.

The lead-out portions 231 and 232 may be integrally formed with the winding portion 210. For example, the winding portion 210 may be formed by winding the above-described linear element, and regions of the linear element extending from the winding portion 210 may function as the lead-out portions 231 and 232.

The metal wire MW may be formed of a conductive material such as copper (Cu), aluminum (Al), silver (Ag), tin (Sn), gold (Au), nickel (Ni), lead (Pb), titanium (Ti), chromium (Cr), molybdenum (Mo), or alloys thereof, but is not limited thereto.

The insulating film IF may contain an insulating material such as enamel, parylene, epoxy, or polyimide. The insulating film IF may include two or more layers. As a non-limitative example, the insulating film IF may include a coating layer that is in contact with the metal wire MW, and a fusion layer formed on the coating layer. The fusion layers of the metal wire MW that form turns adjacent to each other may be bonded to each other by heat and pressure after winding the metal wire MW as the linear element in a coil shape. In a case of winding the metal wire MW including the insulating film IF having such a structure, the fusion layers of a plurality of turns of the winding portion 210 may be fused to each other and integrated. Meanwhile, although FIGS. 1 and 2 illustrate that the coil portion 200 according to the present exemplary embodiment is a so-called alpha winding, the scope of the present exemplary embodiment is not limited thereto, and it may be said that an edge-wise winding also belongs to the present exemplary embodiment.

The surface insulating layer 300 may be disposed on the surface of the body 100. Specifically, the surface insulating layer 300 may be disposed in a region other than regions in which the external electrodes 410 and 420 to be described later are disposed among the first to sixth surfaces 101 to 106 of the body 100. The surface insulating layer 300 may function as a plating resist in forming at least a portion of the external electrodes 410 and 420 to be described later by plating, but is not limited thereto.

The surface insulating layer 300 may have a thickness in a range of 3 μm to 50 μm. In a case where the thickness of the surface insulating layer 300 is less than 3 μm, characteristics of the coil component such as a Q factor, a breakdown voltage, a self-resonant frequency (SRF), and the like may be deteriorated, and in a case where the thickness of the surface insulating layer 300 exceeds 50 μm, a total length, width, and thickness of the coil component may be increased, which is disadvantageous for thinness of the coil component.

The surface insulating layer 300 may include an insulating resin 310 and fillers 320 dispersed in the insulating resin 310.

The fillers 320 may include a material having a higher thermal conductivity than an insulating material of the surface insulating layer 310.

The insulating resin 310 may include epoxy, polyimide, liquid crystal polymer (LCP), or the like, or mixtures thereof, but is not limited thereto. The insulating resin 310 of the surface insulating layer 300 may include a resin that is the same as or similar to the insulating resin 10 of the body 100. In this case, a bonding force between the body 100 and the surface insulating layer 300 may be increased. In some embodiments, the surface insulating layer may be free of magnetic particles.

The fillers 320 may dissipate heat generated in the body 100 to the outside. The fillers 320 may include an insulating material having relatively high thermal conductivity. For example, the fillers 320 may include at least one of aluminum nitride (AlN), boron nitride (BN), alumina ($Al_2O_3$), or silicon carbide (SiC). For example, all particles of the fillers 320 may be silicon carbide (SiC).

The fillers 320 may include first fillers including any one of aluminum nitride (AlN), boron nitride (BN), alumina ($Al_2O_3$), and silicon carbide (SiC), and a second fillers including another one of aluminum nitride (AlN), boron nitride (BN), alumina ($Al_2O_3$), and silicon carbide (SiC). For example, all particles of the first fillers may be silicon carbide (SiC), and all particles of the second fillers may be aluminum nitride (AlN). As another example, all particles of the first fillers may be silicon carbide (SiC), and all particles of the second fillers may be boron nitride (BN). As another example, all particles of the first fillers may be silicon carbide (SiC), and all particles of the second fillers may be alumina ($Al_2O_3$).

Figure 4:
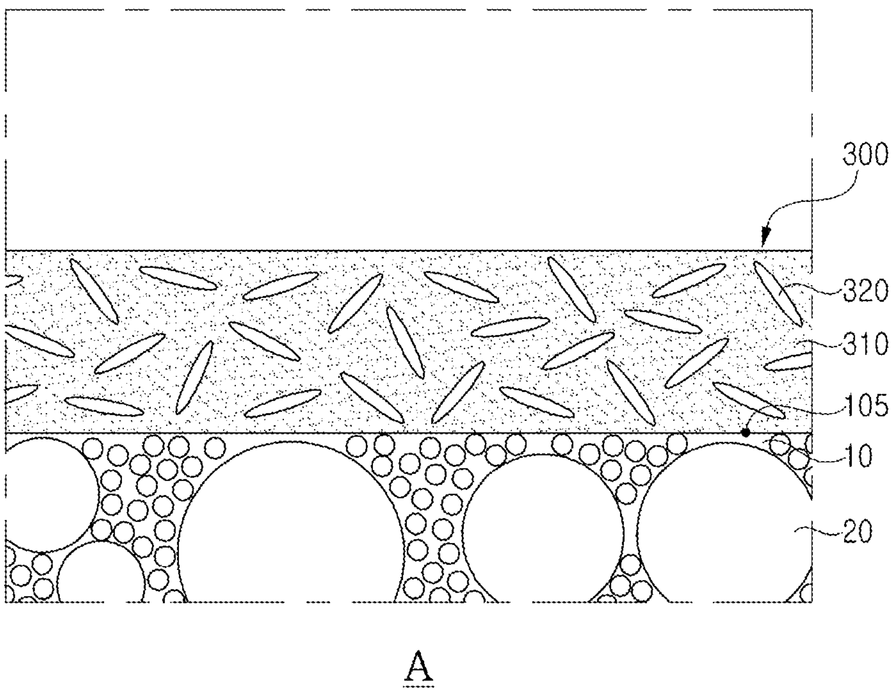
FIG. 4 is a view illustrating a modified example and corresponding to FIG. 3.
Figure 5:
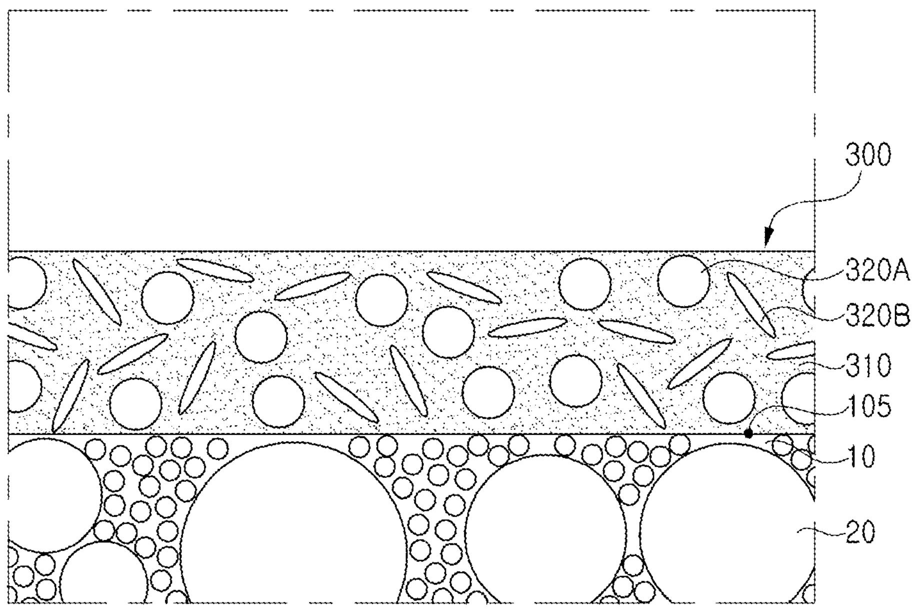
FIG. 5 is a view illustrating another modified example and corresponding to FIG. 3.

The fillers 320 may have at least one of a sphere shape or a flake shape. For example, all particles of the fillers 320 may have a sphere shape as illustrated in FIG. 3, or all particles of the fillers 320 may have a flake shape as illustrated in FIG. 4. Alternatively, the fillers 320 may include a first fillers 320A having a sphere shape and a second fillers 320B having a flake shape as illustrated in FIG. 5. Here, the sphere shape may mean that a cross-sectional shape is a circle shape. In addition, the circle shape does not mean a circle in a mathematical sense, but includes a range that can be recognized as a substantially circle in consideration of processes, such as a difference in radius within 10%. In addition, the flake shape may mean that the cross-sectional shape is, for example, a shape having a major axis and a minor axis perpendicular to each other, and the major axis is at least five times longer than the minor axis.

An average diameter of the fillers 320 may be 5 μm or less. In a case where the average diameter exceeds 5 μm, the thickness of the surface insulating layer 300 may increase. The average diameter of the fillers 320 may be measured using an SEM image of a cross section (L-T cross section) of the central portion in the width direction W taken along the length direction L and the thickness direction T. For example, the average diameter of the fillers 320 may mean the smallest value among all measured dimensions of major axes of the fillers 320 illustrated in the corresponding image, the dimensions being obtained by measurement. Alternatively, the average diameter of the fillers 320 may mean an arithmetic mean value obtained by dividing the sum of all the measured dimensions of the major axes of the fillers 320 illustrated in the corresponding image by the total number of fillers 320 illustrated in the image. Alternatively, the average diameter of the fillers 320 may mean a value corresponding to 50% of all the measured dimensions of the major axes and minor axes of the fillers 320 illustrated in the corresponding image. Alternatively, the average diameter of the fillers 320 may mean a value corresponding to 50% of diameters of virtual circles having the same area as the cross-sectional area of each fillers 320.

In the cross section, a ratio of the cross-sectional area of the fillers 320 to the cross-sectional area of the entire surface insulating layer 300 may be 25% or more and 40% or less. In a case where the ratio is less than 25%, a proportion of the insulating resin 310 in the surface insulating layer 300 increases, which may lead to a chip adhering defect in which chips adhere each other may occur. In a case where the ratio exceeds 40%, the proportion of the insulating resin 310 in the surface insulating layer 300 decreases, which may lead to a problem that the surface insulating layer 300 formed on the surface of the body 100 is peeled off through the process. In some embodiments, a ratio of a cross-sectional area of the fillers to a cross-sectional area of the entire surface insulating layer may be 25% or more and 31.2% or less in a cross section of the surface insulating layer.

Meanwhile, the above-described ratio may be calculated using, for example, an SEM image of a cross section (W-T cross section) of the central portion in the length direction L taken along the width direction W and the thickness direction T. For example, SEM images of a total of six regions (for example, three regions (for example, a horizontal size (W direction)*a vertical size (T direction) of each region may be 40 μm*20 μm) of the surface insulating layer 300 disposed on the fifth surface 105 of the body 100, and three regions (for example, a horizontal size (W direction)*a vertical size (T direction) of each region may be 20 μm*40 μm) of the surface insulating layer 300 disposed on the third surface 103 of the body 100) of the surface insulating layer 300 illustrated in the image may be acquired, and a cross-sectional area of each of the insulating resin 310 and the fillers 320 may be separately acquired and calculated from each of the corresponding images by using an object area tool. Meanwhile, in the images, a boundary between the surface insulating layer 300 and the surfaces of the body 100 may be based on, for example, a position of the uppermost portion of the metal magnetic particles 20 forming the fifth surface 105 of the body 100 in the thickness direction.

The external electrodes 410 and 420 may be disposed on the surface of the body 100 and connected to the lead-out portions 231 and 232. Specifically, in the present exemplary embodiment, the first external electrode 410 may be disposed on the first surface 101 of the body 100 and be in contact with the first lead-out portion 231 of the coil portion 200 exposed to the first surface 101 of the body 100. The second external electrode 420 may be disposed on the second surface 102 of the body 100 and be in contact with the second lead-out portion 232 of the coil portion 200 exposed to the second surface 102 of the body 100.

For example, the external electrode 410 may include a first electrode layer 411 that is in contact with the lead-out portion 231, and a second electrode layer 412 disposed on the first electrode layer 411, and the external electrode 420 may include a first electrode layer 421 that is in contact with the lead-out portion 232, and a second electrode layer 422 disposed on the first electrode layer 421. The first electrode layers 411 and 421 may be plating layers formed of copper (Cu). In this case, the surface insulating layer 300 may function as a plating resist at the time of plating for forming the first electrode layers 411 and 421. Alternatively, the first electrode layers 411 and 421 may be conductive resin electrodes obtained by applying a conductive paste containing conductive powder including at least one of copper (Cu) or silver (Ag) and an insulating resin to the body 100 and curing the conductive paste. The second electrode layers 412 and 422 may be disposed on the first electrode layers 411 and 421, respectively, and may contain at least one of nickel (Ni) or tin (Sn). For example, the second electrode layers 412 and 422 may include a nickel (Ni) plating layer and a tin (Sn) plating layer sequentially plated on the first electrode layers 411 and 421, but the scope of the present disclosure is not limited thereto.

Table 1 below shows an experiment on whether or not a defect in which the surface insulating layer is peeled off (whether or not the surface of the body is exposed) occurs and whether or not a chip adhering defect occurs on the basis of a change in ratio of the cross-sectional area of the fillers to the cross-sectional area of the entire surface insulating layer in the cross section.

Meanwhile, Table 1 below shows a change in ratio of the cross-sectional area of the fillers 320 to the cross-sectional area of the entire surface insulating layer 300 in the cross section of the component according to a change in weight ratio of thermally conductive powder in an insulating material (containing an uncured insulating resin and the thermally conductive powder) for forming the surface insulating layer, and shows whether or not the defect in which the surface insulating layer 300 is peeled off occurs and whether or not the chip adhering defect occurs according to the change.

The ratio of the cross-sectional area of the fillers to the cross-sectional area of the entire surface insulating layer in the cross section of the component was calculated by acquiring SEM images of a total of six regions (for example, three regions (for example, a horizontal size (W direction)*a vertical size (T direction) of each region may be 40 μm*20

μm) of the surface insulating layer 300 disposed on the fifth surface 105 of the body 100, and three regions (for example, a horizontal size (W direction)*a vertical size (T direction) of each region may be 20 μm*40 μm) of the surface insulating layer disposed on the third surface 103 of the body 100) of the surface insulating layer in the cross section, and separately acquiring the cross-sectional area of each of the insulating resin and the fillers from each of the corresponding images by using the object area tool. Meanwhile, in the images, a boundary between the surface insulating layer and the surfaces of the body was based on a position of the uppermost portion of the metal magnetic particles forming the fifth surface of the body in the thickness direction as an example. Meanwhile, the ratio means an average of 30 products prepared for each example, as will be described later.

Whether or not the defect in which the surface insulating layer is peeled off has occurred was determined by preparing 30 products coated with an insulating material for forming the surface insulating layer for each example below and checking edges thereof by using an SEM. For example, an edge where the third and fifth surfaces of the body meet was observed, and in a case where there is at least one product in which a ratio of the sum (A) of lengths of portions exposing the edge to the total length of the edge exceeds 5%, the corresponding example was determined to be defective. In the table below, an example in which the defect has occurred is indicated by O, and an example in which the defect has not occurred is indicated by X.

Whether or not the chip adhering defect has occurred was determined by preparing 30 products coated with an insulating material for forming the surface insulating layer for each example below and checking whether or not the chips have adhered each other by using a perforated screen or a mesh screen. For example, in a case of using the mesh screen, an example in which 1% or more of the input quantity with respect to the total weight was filtered out was determined to be defective. In the table below, an example in which the defect has occurred is indicated by O, and an example in which the defect has not occurred is indicated by X.

TABLE 1

| Example | Weight ratio (%) | Cross-sectional area ratio (%) | Peel-off defect | Chip adhering defect |
|---|---|---|---|---|
| #1 | 80 | 49.4 | ○ | X |
| #2 | 75 | 42.3 | ○ | X |
| #3 | 70 | 36.3 | X | X |
| #4 | 65 | 31.2 | X | X |
| #5 | 60 | 26.8 | X | X |
| #6 | 55 | 23.0 | X | ○ |
| #7 | 50 | 19.6 | X | ○ |

Referring to Table 1, in Examples 1 and 2 in which the ratio of the cross-sectional area of the fillers 320 to the cross-sectional area of the entire surface insulating layer 300 exceeds 40%, a peel-off defect occurred, and in Examples 6 and 7 in which the ratio was less than 25%, the chip adhering defect occurred.

As shown in Table 1, it may be appreciated that, in each of Examples 3 to 5 in which the ratio is 25% or more and 40% or less, heat generated from the component may be released using the surface insulating layer, but a peel-off defect and the chip adhering defect did not occur.

Figure 6:
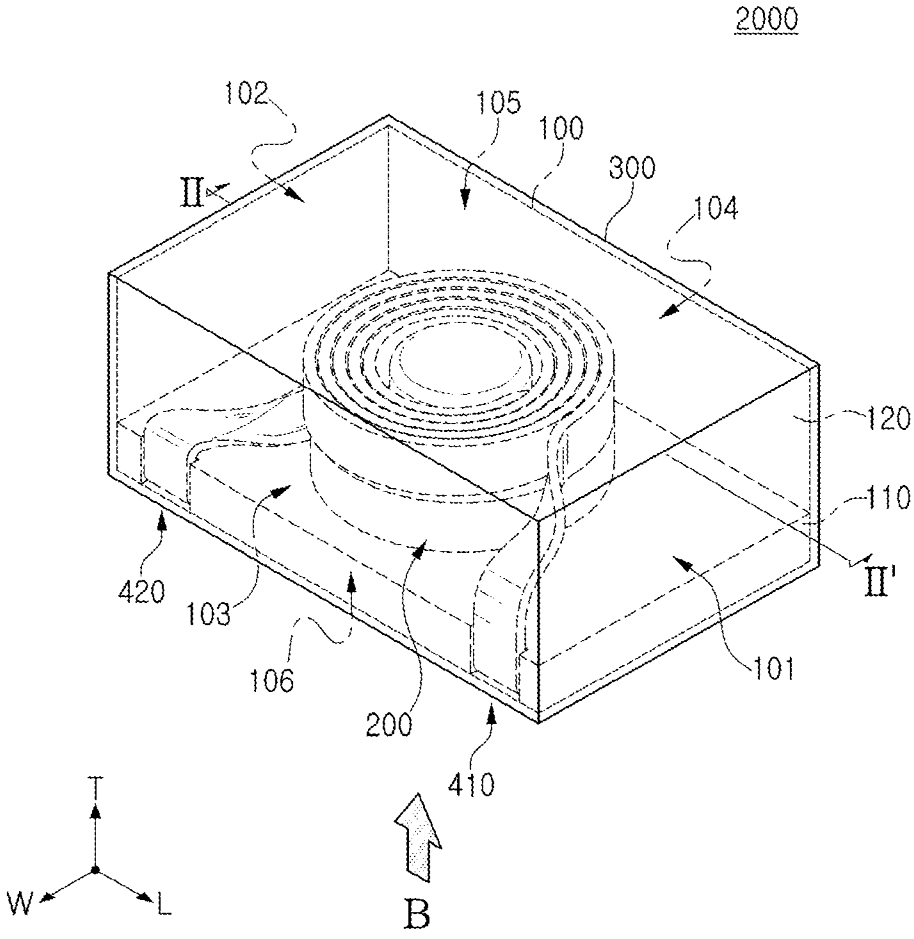
FIG. 6 is a view schematically illustrating a coil component according to another exemplary embodiment in the present disclosure.
Figure 7:
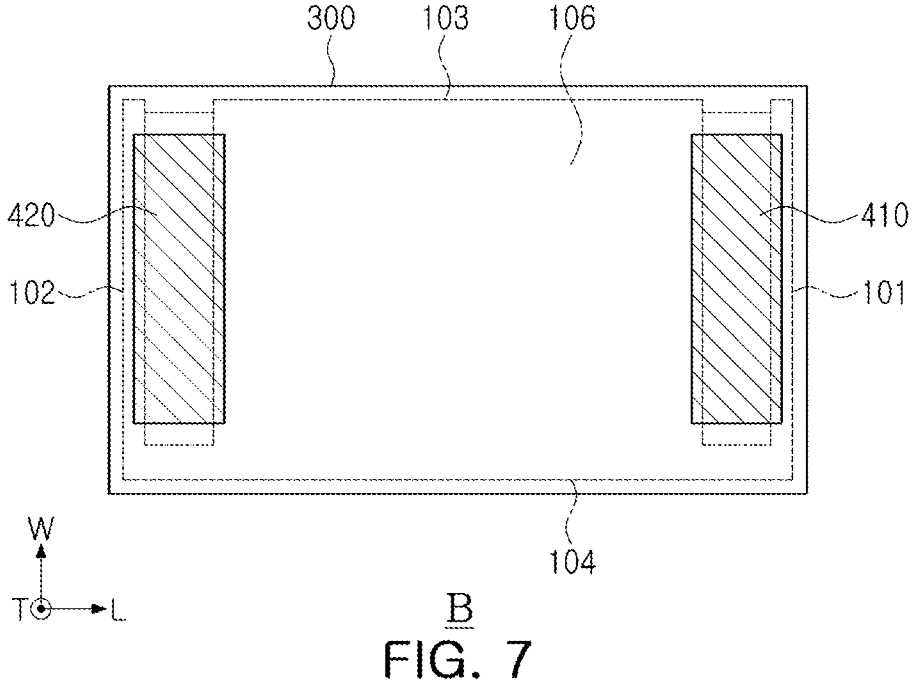
FIG. 7 is a view schematically illustrating the coil component as viewed in a direction B of FIG. 6.
Figure 8:
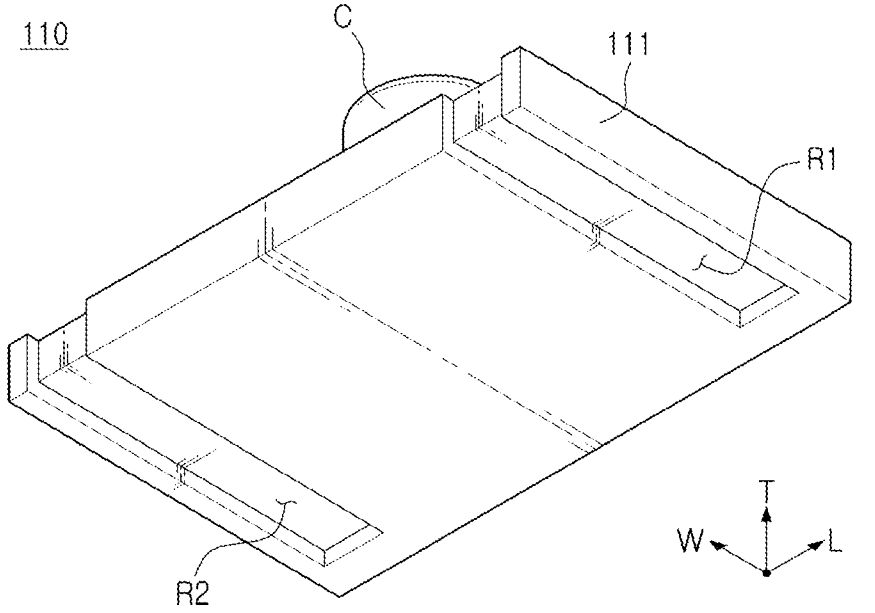
FIG. 8 is a view schematically illustrating a molded portion applied to the coil component illustrated in FIG. 6.
Figure 9:
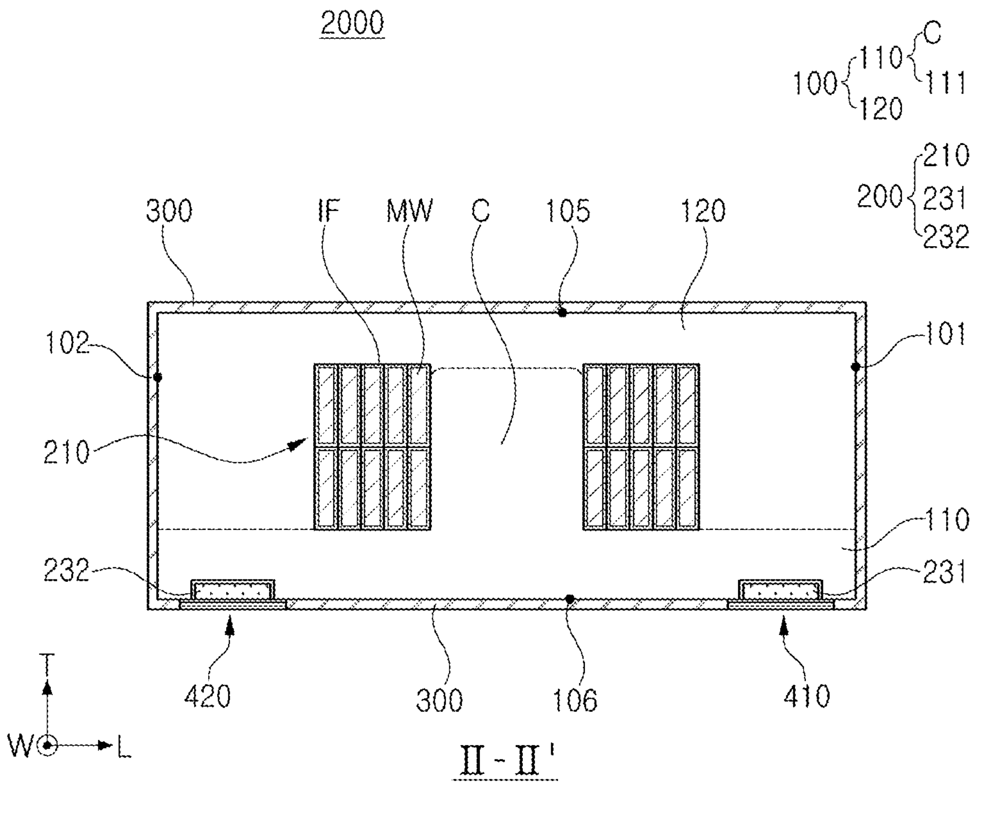
FIG. 9 is a schematic cross-sectional view taken along line II-II' of FIG. 6.

FIG. 6 is a view schematically illustrating a coil component according to another exemplary embodiment in the present disclosure. FIG. 7 is a view schematically illustrating the coil component as viewed in a direction B of FIG. 6. FIG. 8 is a view schematically illustrating a molded portion applied to the coil component illustrated in FIG. 6. FIG. 9 is a schematic cross-sectional view taken along line II-II' of FIG. 6.

Referring to FIGS. 1 and 2 and 6 through 9, a coil component 2000 according to the present exemplary embodiment is different from the coil component 1000 according to an exemplary embodiment in the present disclosure in regard to a structure of a body 100, a surface of the body 100 to which lead-out portions 231 and 232 are exposed, and positions of external electrodes 410 and 420. Therefore, in describing the present exemplary embodiment, only the body 100 and the lead-out portions 231 and 232 different from those of an exemplary embodiment in the present disclosure will be described. For the rest of the configuration of the present exemplary embodiment, the description in an exemplary embodiment in the present disclosure may be applied as it is.

The body 100 applied to the coil component 2000 according to the present embodiment may include a molded portion 110 and a cover portion 120. Side surfaces of the molded portion 110 and the cover portion 120 constitute first to fifth surfaces 101, 102, 103, 104, and 105 of the body 100, and the other surface of the molded portion 110 (a lower surface of the molded portion 110 in directions in FIGS. 8 and 9) constitutes a sixth surface 106 of the body 100. Hereinafter, the other surface of the molded portion 110 and the sixth surface 106 of the body 100 are used in the same meaning.

The molded portion 110 may have a support portion 111 having one surface and the other surface opposing each other, and a core C protruding from one surface of the support portion 111. The support portion 111 may support a coil portion 200 disposed on one surface of the support portion 111. The core C may be disposed so as to protrude from one surface of the support portion 111. The core C may be disposed at a central portion of one surface of the support portion 111 and penetrate through the coil portion 200.

Referring to FIG. 8, groove portions R and R' in which the lead-out portions 231 and 232 extending from opposite end portions of a winding portion 210 may be formed in the other surface of the support portion 111, and one side surface connecting the one surface and the other surface of the support portion 111. The groove portions R and R' may be formed in a shape corresponding to the lead-out portions 231 and 232. Meanwhile, the groove portions R and R' may be formed in a process of forming the molded portion 110 with a mold or may be formed in the molded portion 110 in a process of pressing the cover portion 120. As another example, the lead-out portions 231 and 232 may penetrate through the molded portion 110 and be exposed to the other surface of the molded portion 110.

For example, the molded portion 110 may be formed using a mold having an internal space corresponding to the shape of the support portion 111 and the core C. The molded portion 110 may be formed by filling the mold with a composite material containing metal magnetic powder and an insulating resin. The metal magnetic powder of the composite material may be metal magnetic particles 20 of the body 100. A process of applying a high temperature and a high pressure to the composite material in the mold may be additionally performed, but the scope of the present disclosure is not limited thereto. The support portion 111 and the core C may be integrally formed by the process using the above-described mold so that a boundary is not formed between the support portion 111 and the core C.

The cover portion 120 may be disposed on one surface of the molded portion 110 and cover the coil portion 200. The cover portion 120 may be formed by disposing a magnetic composite sheet in which metal magnetic powder is dispersed in an insulating resin on the molded portion 110 and the coil portion 200 and then heating and pressing the magnetic composite sheet. Through the above-described process, the molded portion 110 and the cover portion 120 may be integrated with each other so that a boundary therebetween is not apparent without separate processing, but the scope of the present disclosure is not limited thereto.

Both of the first and second lead-out portions 231 and 232 applied to the present exemplary embodiment may be exposed to the sixth surface 106 of the body 100, unlike in an exemplary embodiment in the present disclosure. That is, the first and second lead-out portions 231 and 232 may be disposed in the groove portions R and R' of the molded portion 110 and exposed to the sixth surface 106 of the body 100 while being spaced apart from each other.

A surface insulating layer 300 may cover the first to sixth surfaces 101 to 106 of the body 100, but the surface insulating layer 300 has openings for exposing the first and second lead-out portions 231 and 232 exposed to the sixth surface 106 of the body 100. The external electrodes 410 and 420 may be disposed in the opening so that the external electrodes 410 and 420 and the lead-out portions 231 and 232 are connected to each other.

For example, as illustrated in FIG. 7, a dimension of each of the openings in which the external electrodes 410 and 420 are disposed in the length direction L may be larger than a dimension of each of the lead-out portions 231 and 232 in the length direction L. Accordingly, each of the openings may further expose at least a portion of the sixth surface 106 of the body 100 in addition to the lead-out portions 231 and 232.

The external electrodes 410 and 420 may be disposed only on the sixth surface 106 of the body 100. The external electrodes 410 and 420 may be disposed on the sixth surface 106 of the body 100 while being spaced apart from each other.

Figure 10:
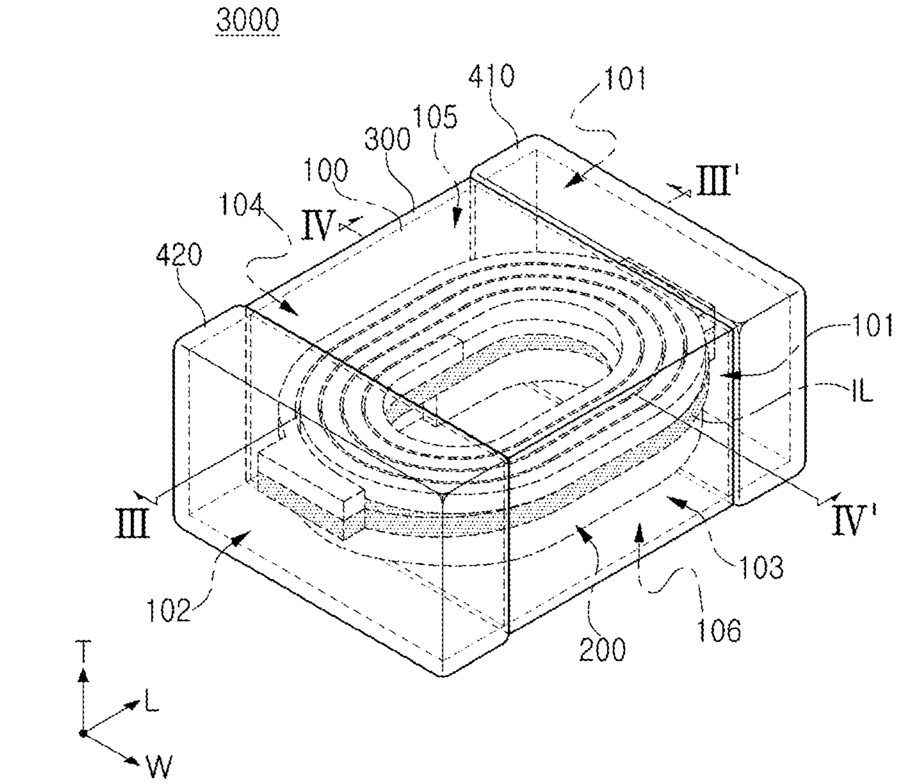
FIG. 10 is a view schematically illustrating a coil component according to another exemplary embodiment in the present disclosure.
Figure 11:
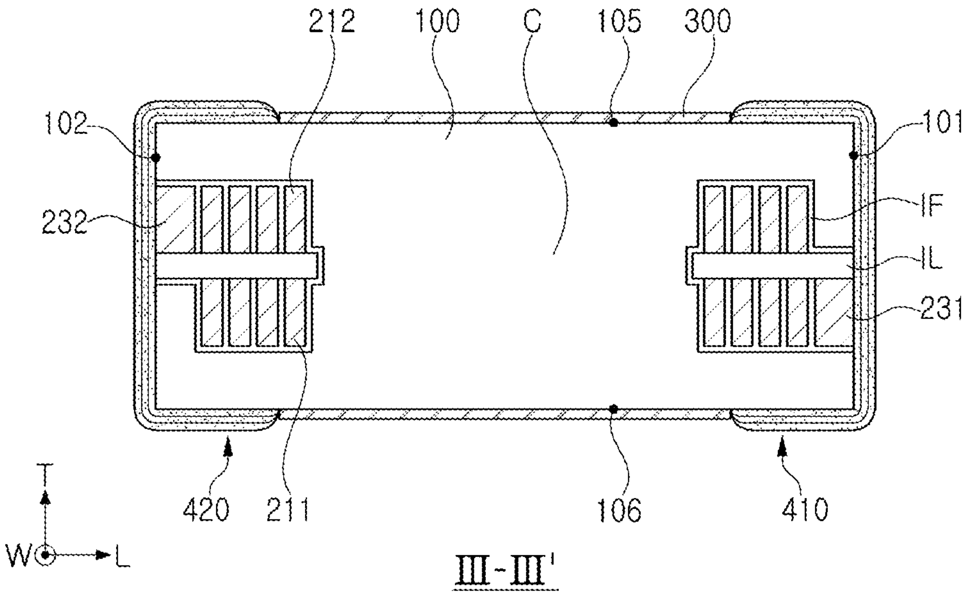
FIG. 11 is a schematic cross-sectional view taken along line III-III' of FIG. 10.
Figure 12:
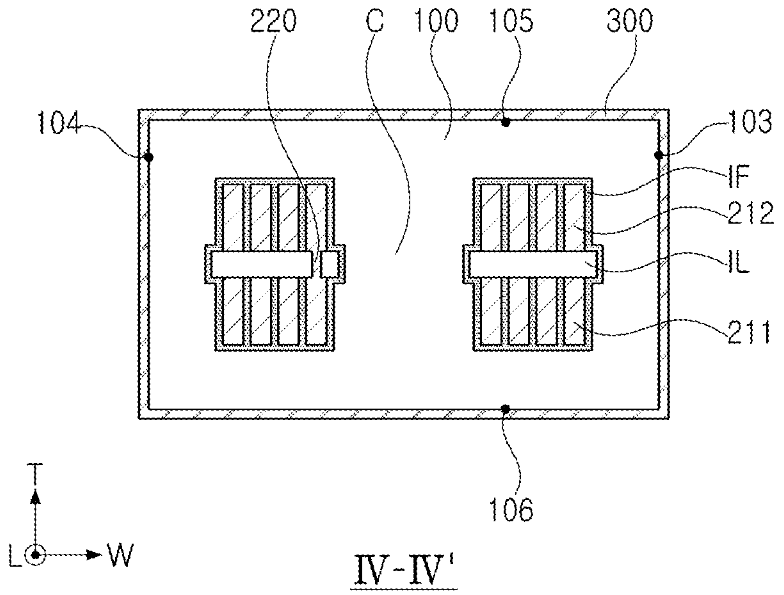
FIG. 12 is a schematic cross-sectional view taken along line IV-IV' of FIG. 10.

FIG. 10 is a view schematically illustrating a coil component according to another exemplary embodiment in the present disclosure. FIG. 11 is a schematic cross-sectional view taken along line III-III' of FIG. 10. FIG. 12 is a schematic cross-sectional view taken along line IV-IV' of FIG. 10.

Referring to FIGS. 1 and 2 and 10 through 12, a coil component 3000 according to the present exemplary embodiment is different from the coil component 1000 according to an exemplary embodiment in the present disclosure in regard to a coil portion 200, and the coil component 3000 may further include a substrate IL. Therefore, in describing the present exemplary embodiment, only the coil portion 200 different from that of an exemplary embodiment in the present disclosure and the substrate IL will be described. For the rest of the configuration of the present exemplary embodiment, the description in an exemplary embodiment in the present disclosure may be applied as it is.

The substrate IL may be disposed in the body 100. The substrate IL may be a component supporting the coil portion 200. The substrate IL may be formed of an insulating material including at least one of a thermosetting insulating resin such as an epoxy resin, a thermoplastic insulating resin such as a polyimide resin, or a photosensitive insulating resin. Alternatively, the substrate IL may be formed of an insulating material having a reinforcement material such as a glass fiber or an inorganic filler impregnated in the at least one resin described above. For example, the substrate IL may be formed of an insulating material such as a copper clad laminate (CCL), an unclad CCL, prepreg, an Ajinomoto Build-up Film (ABF), FR-4, a Bismaleimide Triazine (BT) film, a photoimagable dielectric (PID) film, or the like, but is not limited thereto.

As the inorganic filler, at least one selected from the group consisting of silica ($SiO_2$), alumina ($Al_2O_3$), silicon carbide (SiC), barium sulfate ($BaSO_4$), talc, clay, mica powders, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

In a case where the substrate IL is formed of the insulating material including the reinforcement material, the substrate IL may provide more excellent rigidity. In a case where the substrate IL is formed of an insulating material that does not include a glass fiber, the substrate IL may be advantageous in increasing a volume of the coil portion 200 at the same size of the body 100. In a case where the substrate IL is formed of the insulating material including the photosensitive insulating resin, the number of processes for forming the coil portion 200 may be decreased, which is advantageous in decreasing a production cost, and a fine via may be formed.

The coil portion 200 may include coil patterns 211 and 212, lead-out portions 231 and 232, and a via 220. Specifically, in directions in FIGS. 11 and 12, the first coil pattern 211 and the first lead-out portion 231 may be disposed on a lower surface of the substrate IL that faces a sixth surface 106 of a body 100, and the second coil pattern 212 and the second lead-out portion 232 may be disposed on an upper surface of the substrate IL that opposes the lower surface of the substrate IL. The first coil pattern 211 may be in contact with the first lead-out portion 231 on the lower surface of the substrate IL. The second coil pattern 212 may be in contact with the second lead-out portion 232 on the upper surface of the substrate IL, and the via 220 may penetrate through the substrate IL and be in contact with an inner end portion of each of the first coil pattern 211 and the second coil pattern 212. By doing so, the coil portion 200 may function as a single coil as a whole.

Each of the first coil pattern 211 and the second coil pattern 212 may have a planar spiral shape forming at least one turn around a core C. For example, the first coil pattern 211 may form at least one turn around the core C on the lower surface of the substrate IL.

The lead-out portion 231 and 232 may be exposed to first and second surfaces 101 and 102 of the body 100, respectively. Specifically, the first lead-out portion 231 may be exposed to the first surface 101 of the body 100, and the second lead-out portion 232 may be exposed to the second surface 102 of the body 100.

At least one of the coil patterns 211 and 212, the via 220, or the lead-out portions 231 and 232 may include at least one conductive layer. For example, in the directions in FIGS. 11 and 12, in a case where the second coil pattern 212, the via 220, and the second lead-out portion 232 are formed on the upper surface of the substrate IL by plating, each of the second coil pattern 212, the via 220, and the second lead portion 232 may include a seed layer such as an electroless plating layer and an electroplating layer. Here, the electroplating layer may have a single-layer structure or have a multilayer structure. The electroplating layer having the multilayer structure may be formed in a conformal film structure in which one electroplating layer is covered by another electroplating layer, or may be formed in a shape in which one electroplating layer is stacked on only one surface of another electroplating layer. The seed layers of the second coil pattern 212, the via 220, and the second lead-out portion 232 may be formed integrally with each other, such that a boundary is not formed therebetween. However, the seed layers are not limited thereto. The electroplating layers of the second coil pattern 212, the via 220, and the second lead-out portion 232 may be formed integrally with each other, such that a boundary is not formed therebetween. However, the electroplating layers are not limited thereto.

The coil patterns 211 and 212, the via 220, and the lead-out portions 231 and 232 may each be formed of a conductive material such as copper (Cu), aluminum (Al), silver (Ag), tin (Sn), gold (Au), nickel (Ni), lead (Pb), titanium (Ti), chromium (Cr), or alloys thereof, but are not limited thereto. For example, the first coil pattern 211 may include a seed layer that is in contact with the substrate IL and contains copper (Cu) and an electroplating layer that is disposed on the seed layer and contains copper (Cu), but the scope of the present disclosure is not limited thereto.

An insulating film IF may be disposed between the coil portion 200 and the body 100. The insulating film IF may be formed by at least one of a vapor deposition method or a film stacking method. In the latter case, the insulating film IF may be a permanent resist which is a plating resist used in plating the coil portion 200 on the substrate IL and remaining in a final product, but is not limited thereto. The insulating film IF may contain an insulating material such as parylene, epoxy, or polyimide. The insulating film IF according to the present exemplary embodiment may be different from the insulating film IF described in an exemplary embodiment in the present disclosure in regard that the insulating film IF according to the present exemplary embodiment does not cover a lower surface of each turn of the coil portion 200.

As set forth above, according to the exemplary embodiment in the present disclosure, the heat dissipation performance of the coil component may be improved.

The defect in which the coating layer is peeled off may be prevented while improving the heat dissipation performance of the coil component.

The chip adhering defect may be prevented while improving the heat dissipation performance of the coil component.

While exemplary embodiments have been shown and described above, it will be apparent to those skilled in the art that modifications and variations could be made without departing from the scope of the present disclosure as defined by the appended claims.

What is claimed is:

1. A coil component comprising:
- a body;
- a coil portion disposed in the body and including lead-out portions extending from one surface of the body;
- external electrodes disposed on the body and connected to the lead-out portions; and
- a surface insulating layer disposed on the body and including fillers,
- wherein a ratio of a cross-sectional area of the fillers collectively to a cross-sectional area of the entire surface insulating layer is 25% or more and 40% or less in a cross section of the surface insulating layer.

2. The coil component of claim 1, wherein the fillers include at least one of aluminum nitride (AlN), boron nitride (BN), alumina (Al2O3), and silicon carbide (SiC).

3. The coil component of claim 2, wherein the fillers include a first fillers including any one of aluminum nitride (AlN), boron nitride (BN), alumina (Al2O3), and silicon carbide (SiC), and a second fillers including another one of aluminum nitride (AlN), boron nitride (BN), alumina (Al2O3), and silicon carbide (SiC).

4. The coil component of claim 2, wherein the fillers have at least one of a sphere shape and a flake shape.

5. The coil component of claim 4, wherein the fillers include a first fillers having a sphere shape and a second fillers having a flake shape.

6. The coil component of claim 4, wherein an average diameter of the fillers is 5 μm or less.

7. The coil component of claim 6, further comprising a substrate disposed in the body and having at least one surface on which the coil portion is disposed.

8. The coil component of claim 7, further comprising an insulating film disposed between the coil portion and the body.

9. The coil component of claim 6, wherein the coil portion is a winding type coil.

10. The coil component of claim 6, wherein the lead-out portions include a first lead-out portion extending from the one surface of the body and a second lead-out portion extending from the other surface of the body that opposes the one surface of the body, and
- the external electrodes include a first external electrode that is disposed on the one surface of the body and is in contact with the first lead-out portion, and a second external electrode that is disposed on the other surface of the body and is in contact with the second lead-out portion.

11. The coil component of claim 10, wherein each of the first and second external electrodes includes a first electrode layer that is in contact with the first or second lead-out portion, and a second electrode layer disposed on the first electrode layer.

12. The coil component of claim 6, wherein the lead-out portions include first and second lead-out portions extending from the one surface of the body while being spaced apart from each other, and
- the external electrodes include first and second external electrodes that are disposed on the one surface of the body while being spaced apart from each other and are in contact with the first and second lead-out portions, respectively.

13. The coil component of claim 1, wherein the cross section of the surface insulating layer is a cross section of a central portion of the body in a length direction taken along a width direction and a thickness direction.

14. The coil component of claim 1, wherein the surface insulating layer is free of magnetic particles.

15. The coil component of claim 1, comprising a single coil portion.

16. The coil component of claim 1, wherein a ratio of a cross-sectional area of the fillers to a cross-sectional area of the entire surface insulating layer is 25% or more and 31.2% or less in a cross section of the surface insulating layer.

17. The coil component of claim 1, wherein the fillers have a flake shape.

18. The coil component of claim 1, wherein the fillers include a material having a higher thermal conductivity than an insulating material of the surface insulating layer.

19. The coil component of claim 18, wherein the fillers include at least one of aluminum nitride (AlN), boron nitride (BN), alumina (Al2O3), and silicon carbide (SiC).

20. The coil component of claim 19, wherein the fillers include a first fillers having a sphere shape and a second fillers having a flake shape.

21. The coil component of claim 19, wherein an average diameter of the fillers is 5 μm or less.

* * * * *